United States Patent
Jung

(10) Patent No.: US 12,358,534 B2
(45) Date of Patent: Jul. 15, 2025

(54) DRIVING ASSISTANCE APPARATUS AND DRIVING ASSISTANCE METHOD

(71) Applicant: HL Klemove Corp., Incheon (KR)

(72) Inventor: Soomyung Jung, Seoul (KR)

(73) Assignee: HL Klemove Corp., Incheon (KR)

( * ) Notice: Subject to any disclaimer, the term of this patent is extended or adjusted under 35 U.S.C. 154(b) by 214 days.

(21) Appl. No.: 18/112,799

(22) Filed: Feb. 22, 2023

(65) Prior Publication Data

US 2023/0264714 A1    Aug. 24, 2023

(30) Foreign Application Priority Data

Feb. 23, 2022   (KR) ........................ 10-2022-0023705

(51) Int. Cl.
*B60W 60/00* (2020.01)

(52) U.S. Cl.
CPC ... *B60W 60/0018* (2020.02); *B60W 2420/403* (2013.01); *B60W 2556/65* (2020.02); *B60W 2756/10* (2020.02)

(58) Field of Classification Search
CPC ....... B60W 60/0018; B60W 2420/403; B60W 2556/65; B60W 2756/10; B60W 30/165; B60W 60/0015; B60W 60/0016; B60W 30/08; B60W 30/10; B60W 40/02; B60W 40/105; B60W 50/14; B60W 2540/215; B60W 2554/4046; B60W 2556/45; B60W 2050/143; B60W 2520/10
See application file for complete search history.

(56) References Cited

U.S. PATENT DOCUMENTS

| | | | | |
|---|---|---|---|---|
| 10,377,303 | B2 * | 8/2019 | McNew | ................ B60W 50/14 |
| 2015/0194057 | A1 * | 7/2015 | Jin | .................... B60W 30/0956 |
| | | | | 348/148 |

(Continued)

FOREIGN PATENT DOCUMENTS

| | | | | |
|---|---|---|---|---|
| GB | 2579346 A | * | 6/2020 | ............. G01C 21/26 |
| JP | 2007045356 A | * | 2/2007 | |

(Continued)

OTHER PUBLICATIONS

Machine translation of JP2007045356, downloaded from IP.com Nov. 12, 2024. (Year: 2024).*

(Continued)

*Primary Examiner* — Kito R Robinson
*Assistant Examiner* — Tanya C Sienko
(74) *Attorney, Agent, or Firm* — Harvest IP Law, LLP

(57) ABSTRACT

Disclosed herein are a driving assistance apparatus and a driving assistance method. The present disclosure is directed to allowing a driver to quickly and preferably respond to an emergency situation that is not found due to a sensor recognition error during autonomous driving of a vehicle. To this end, a driving assistance method according to the present disclosure includes monitoring a change in driving route of another vehicle traveling in front of a host vehicle through a camera of the host vehicle, receiving a guide route for autonomous driving through vehicle to everything (V2X) communication, and upon the received guide route not matching the driving route of the another vehicle, decelerating the host vehicle to a preset speed so that the host vehicle slowly travels along the guide route.

13 Claims, 5 Drawing Sheets

(56) References Cited

U.S. PATENT DOCUMENTS

| | | | | |
|---|---|---|---|---|
| 2018/0257647 A1* | 9/2018 | Jurca | .................... | G01S 13/931 |
| 2020/0410852 A1* | 12/2020 | Lee | ...................... | B60W 30/14 |
| 2021/0129843 A1* | 5/2021 | George | ................. | G06V 20/58 |
| 2024/0210962 A1* | 6/2024 | Duerr | ..................... | G05D 1/226 |

FOREIGN PATENT DOCUMENTS

| | | | |
|---|---|---|---|
| JP | 6815724 B2 | 1/2021 | |
| KR | 10-2019-0002950 A | 1/2019 | |

OTHER PUBLICATIONS

Office Action from Korean Patent Office for a corresponding Korean patent application, dated Sep. 30, 2024.

\* cited by examiner

DRIVING ASSISTANCE APPARATUS AND DRIVING ASSISTANCE METHOD

CROSS-REFERENCE TO RELATED APPLICATION

This application claims the benefit of Korean Patent Application No. 10-2022-0023705, filed on Feb. 23, 2022 in the Korean Intellectual Property Office, the disclosure of which is incorporated herein by reference.

BACKGROUND

1. Field

Embodiments of the present disclosure relate to a vehicle and relate to driving assistance control for a vehicle.

2. Description of the Related Art

Autonomous driving of vehicles allows the vehicles to travel from a starting point to a destination without driver intervention.

Autonomous vehicles perform autonomous driving along a set route from a starting point to a destination. Therefore, in order for autonomous vehicles to operate in an autonomous driving mode, a route should be set. To this end, a navigation device of an autonomous vehicle receives a destination from a driver and generates a route to the destination.

However, errors may occur in sensor recognition and determination depending on driving environments such as road conditions or weather, making it difficult to respond to unexpected emergency situations.

SUMMARY

Therefore, it is an aspect of the present disclosure to enable a quick and appropriate response to an emergency situation that is not found due to a sensor recognition error during autonomous driving of a vehicle.

Additional aspects of the disclosure will be set forth in part in the description which follows and, in part, will be obvious from the description, or may be learned by practice of the disclosure.

In accordance with one aspect of the present disclosure, a driving assistance method includes monitoring a change in driving route of another vehicle traveling in front of a host vehicle through a camera of the host vehicle, receiving a guide route for autonomous driving through vehicle to everything (V2X) communication, and decelerating the host vehicle to a preset speed so that the host vehicle slowly travels along the guide route, based on the received guide route not matching the driving route of the other vehicle.

The driving assistance method may further include outputting a warning message to prepare for an emergency situation ahead of the host vehicle, based on the received guide route not matching the driving route of the other vehicle.

The driving assistance method may further include increasing a speed of the host vehicle to a speed before the deceleration so that the host vehicle travels along the guide route, based on receiving a driver's confirmation of the warning message.

The driving assistance method may further include maintaining a slow moving state along the guide route based on not receiving the driver's confirmation of the warning message.

The driving assistance method may further include driving the host vehicle along the same route as the other vehicle in front, based on the received guide route matching the driving route of the other vehicle.

The driving assistance method may further include receiving route information from the other vehicle in front through the V2X communication to drive the host vehicle along the same route as the other vehicle in front.

The driving assistance method may further include driving the host vehicle along the received guide route, based on the other vehicle not being present in front of the host vehicle.

The other vehicle traveling in front of the host vehicle may be another vehicle traveling in the same lane as a lane in which the host vehicle drives.

In accordance with another aspect of the present disclosure, a driving assistance apparatus includes a camera provided to photograph surroundings of a host vehicle, and a processor configured to monitor a change in driving route of another vehicle traveling in front of the host vehicle through the camera, receive a guide route for autonomous driving through V2X communication, and perform control such that the host vehicle decelerates to a preset speed so that the vehicle slowly travels along the guide route, based on the received guide route not matching the driving route of the other vehicle.

The processor may further perform control such that a warning message is output to prepare for an emergency situation ahead of the host vehicle, based on the received guide route not matching the driving route of the other vehicle.

The process may further perform control such that a speed of the host vehicle increases to a speed before the deceleration so that the host vehicle travels along the guide route, based on a driver's confirmation of the warning message being received.

The processor may further perform control such that a slow moving state is maintained along the guide route, based on the driver's confirmation of the warning message not being received.

The processor may further perform control such that the host vehicle travels along the same route as the other vehicle in front, based on the received guide route matching the driving route of the other vehicle.

The processor may further receive route information from the other vehicle in front through the V2X communication to drive the host vehicle along the same route as the other vehicle in front.

The processor may further perform control such that the host vehicle travels along the received guide route, based on the other vehicle not being present in front of the host vehicle.

The other vehicle traveling in front of the host vehicle may be another vehicle traveling in the same lane as a lane in which the host vehicle drives.

In accordance with still another aspect of the present disclosure, a driving assistance method includes monitoring a change in driving route of another vehicle traveling in front of a host vehicle through a camera of the host vehicle, receiving a guide route for autonomous driving through vehicle to everything (V2X) communication, upon the received guide route not matching the driving route of the other vehicle, outputting a warning message to prepare for an emergency situation ahead of the vehicle and decelerating the host vehicle to a preset speed so that the host vehicle slowly travels along the guide route, and increasing a speed of the host vehicle to a speed before the deceleration so that the host vehicle travels along the guide route, based on receiving a driver's confirmation of the warning message.

In accordance with yet another aspect of the present disclosure, a driving assistance apparatus includes a camera provided to photograph the surroundings of a host vehicle, and a processor configured to monitor a change in driving route of another vehicle traveling in front of the host vehicle through the camera, receive a guide route for autonomous driving V2X communication, upon the received guide route not matching the driving route of the other vehicle, perform control such that the host vehicle decelerates to a preset speed so that the vehicle slowly travels along the guide route, and perform control such that a speed of the host vehicle increases to a speed before the deceleration so that the host vehicle travels along the guide route, based on a driver's confirmation of the warning message being received.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
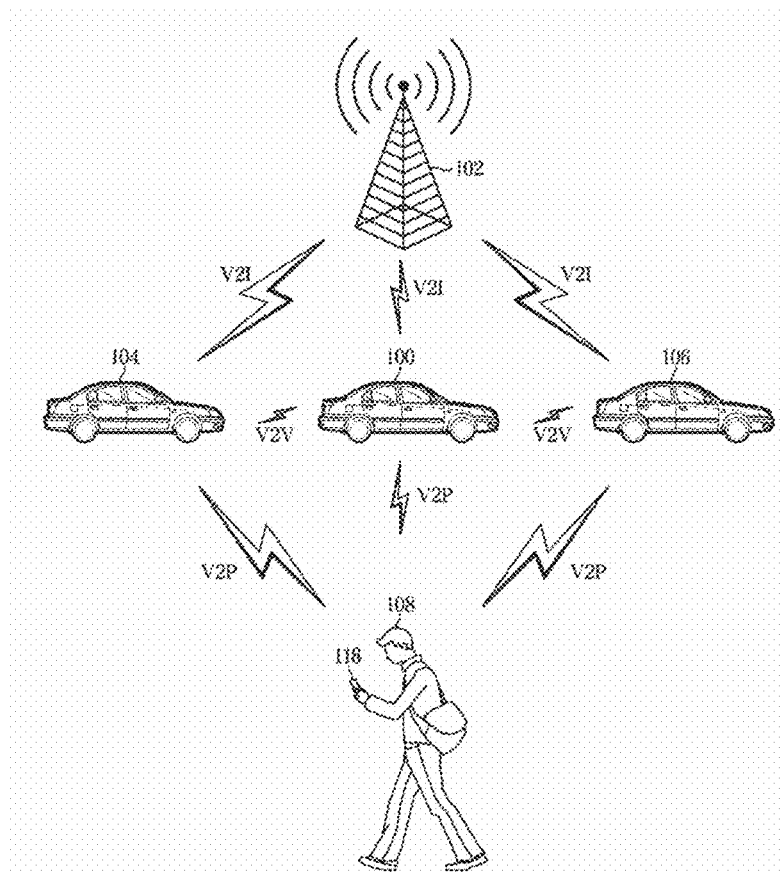
FIG. 1 is a diagram illustrating vehicle to everything (V2X) communication of a vehicle according to one embodiment of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

FIG. 1 is a diagram illustrating vehicle to everything (V2X) communication of a vehicle according to one embodiment of the present disclosure.

V2X communication means "vehicle to everything" communication and may be interpreted as "communication between a vehicle and entities (people)." As shown in FIG. 3, V2X communication is a technology in which a vehicle 100 in operation exchanges and shares road infrastructure, traffic information, pedestrian information, or the like through wireless communication. V2X communication is implemented centering on a vehicle as in vehicle to infrastructure (V2I), vehicle to vehicle (V2V), and vehicle to pedestrian (V2P). In the following description, for the purpose of distinguishing the vehicle 100 from other vehicles 104 and 106, the name "host vehicle 100" will also be used interchangeably with the vehicle 100.

The vehicle 100 according to the embodiment of the present disclosure exchanges information about a surrounding situation of the vehicle 100 with a surrounding V2X base station 102, other vehicles 104 and 106, and a mobile device 118 of a pedestrian 108 through V2X communication. To this end, the vehicle 100 performs V2I communication with the V2X base station 102, performs V2V communication with other vehicles 104 and 106, and performs V2P communication with the mobile device 118 of the pedestrian 108. Strictly speaking, V2P communication is communication with the mobile device 118 carried by the pedestrian 108 rather than communication with the pedestrian 108.

The vehicle 100 performs bidirectional communication for creating a safe and pleasant driving environment by exchanging messages through V2I communication, V2V communication, and V2P communication.

Figure 2:
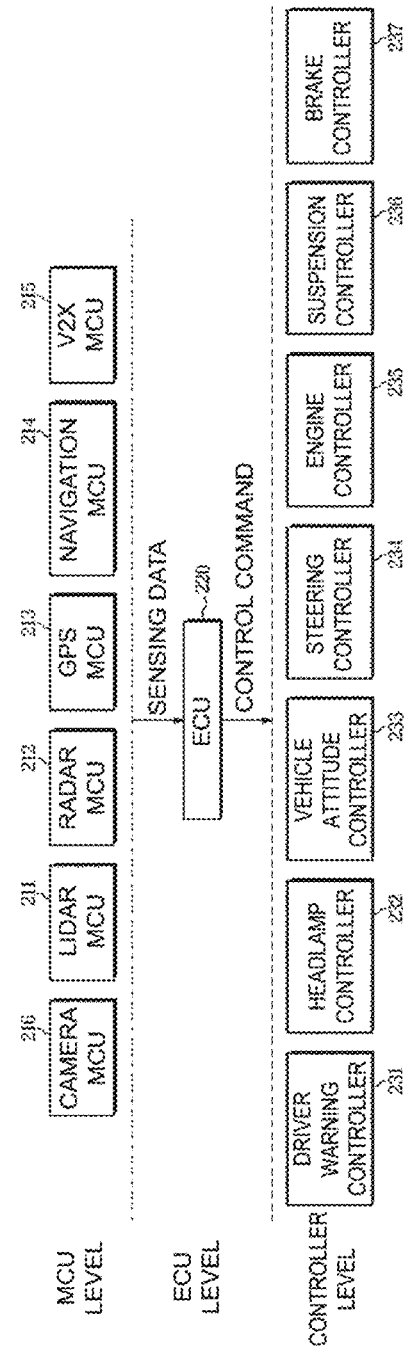
FIG. 2 is a diagram illustrating a control system for a vehicle according to one embodiment of the present disclosure.

FIG. 2 is a diagram illustrating a control system for a vehicle according to one embodiment of the present disclosure. As shown in FIG. 2, the control system for a vehicle according to the embodiment of the present disclosure may be divided into a main control unit (MCU) level, an electrical control unit (ECU) level, and a controller level.

At the MCU level, there are a camera MCU 216, a light detection and ranging (LIDAR) MCU 211, a radar MCU 212, a global positioning system (GPS) MCU 213, a navigation MCU 214, a V2X MCU 215 (communication unit), and the like. The MCUs belonging to the MCU level control sensing devices connected thereto or devices (for example, processors) connected to the sensing devices and receive data from the sensing devices or the devices connected to the sensing devices.

Regarding the camera MCU 216, for example, an image sensor senses an image of a subject captured through a lens, an image processor receives and processes sensed data from the image sensor, and the camera MCU 216 receives the processed data from the image processor. The camera MCU 216 controls the image sensor and the image processor, and such control includes, for example, power supply control, reset control, clock (CLK) control, data communication control, power source control, memory control, and the like.

Regarding the LiDAR MCU 211, for example, the LiDAR MCU 211 is connected to a LIDAR device that is a sensor. The LiDAR device may include a laser transmission module, a laser detection module, a signal collecting and processing module, and a data transmission/reception module. As a laser light source, laser light sources having a wavelength in a wavelength range of 250 nm to 11 μm or having a tunable wavelength are used. In addition, the LiDAR device is classified into a time of flight (TOF) type and a phase shift type according to a signal modulation method. The LiDAR MCU 211 controls the LiDAR device and other devices connected to the LiDAR device (for example, a LiDAR processor (not shown) for processing a LIDAR sensing output). Such control includes, for example, power supply control, reset control, CLK control, data communication control, memory control, and the like. Meanwhile, the LiDAR device is used to sense a region in front of the vehicle. The LiDAR device is positioned at an inside front side of the vehicle, specifically, under a windshield, and transmits and receives laser light through the windshield.

Regarding the radar MCU 212, for example, the radar MCU 212 is connected to a radar device that is a sensor. The radar device is a sensor device that uses electromagnetic waves to measure a distance, a speed, or an angle of an object. When the radar device is used, objects up to 150 m ahead in a horizontal angle of 30° may be detected using a frequency modulation carrier wave (FMCW) or pulse carrier method. The radar MCU 212 controls the radar device and other devices connected to the radar device (for example, a radar processor (not shown) for processing a radar sensing output). Such control includes, for example, power supply control, reset control, CLK control, data communication control, memory control, and the like. Meanwhile, the radar device typically uses a 77 GHz band radar or other appropriate frequency bands to sense a region in front of the vehicle. Information acquired from the radar device may be used for advanced driver assistance system (ADAS) technology such as adaptive cruise control (ACC). Meanwhile, the radar processor may process data sensed and output by the radar device, and such processing may include enlarging a sensed object in front or focusing on a region of the object in an entire field of view.

Regarding the GPS MCU 213, for example, the GPS MCU 213 is connected to a GPS device that is a sensor. The GPS device is a device that may measure a position and a speed of the vehicle and a time using communication with satellites. Specifically, the GPS device is a device that measures a delay time of radio waves emitted from satellites and obtains a current position from a distance from an orbit. The GPS MCU 213 controls the GPS device and other devices connected to the GPS device (for example, a GPS processor (not shown) for processing a GPS sensing output). Such control includes, for example, power supply control, reset control, CLK control, data communication control, memory control, and the like.

Regarding the navigation MCU 214, for example, the navigation MCU 214 is connected to a navigation device that is a sensor. The navigation device is a device that displays map information through a display device installed at a front side of the interior of the vehicle. Specifically, the map information is stored in a memory device, and a current position of the vehicle measured through the GPS device is displayed on the map data. The navigation MCU 214 controls the navigation device and other devices connected to the navigation device (for example, a navigation processor (not shown) for processing a navigation sensing output). Such control includes, for example, power supply control, reset control, CLK control, data communication control, memory control, and the like.

Regarding the V2X MCU 215, for example, the V2X MCU 215 is connected to a V2X device that is a sensor. The V2X MCU 215 may be a communicator. Specifically, the V2X device is a device that performs V2V communication, V2I communication, and V2N communication. The V2X MCU 215 controls the V2X device and other devices connected to the V2X device (for example, a V2X processor (not shown) for processing a V2X sensing output). Such control includes, for example, power supply control, reset control, CLK control, data communication control, memory control, and the like.

An ECU 220 belonging to the ECU level is a device that integrally controls a plurality of electronic devices used in the vehicle. The ECU 220 may include a processor. For example, the ECU 220 may control all of the MCUs belonging to the MCU level and controllers belonging to the controller level. The ECU 220 receives sensing data from the MCUs, generates a control command for controlling the controllers according to a situation, and transmits the control command to the controllers. Meanwhile, in the present specification, for convenience of description, the ECU level is described as a level that is higher than the MCU level. However, one MCU of the MCUs belonging to the MCU level may serve as an ECU, and two MCUs may also serve as an ECU in combination.

At the controller level, there are a driver warning controller 231, a headlamp controller 232, a vehicle attitude controller 233, a steering controller 234, an engine controller 235, a suspension controller 236, a brake controller 237, and the like. The controllers control components of the vehicle based on a control command received from the ECU 220.

Regarding the driver warning controller 231, for example, the driver warning controller 231 generates an audio warning signal, a video warning signal, or a haptic warning signal in order to warn a driver of a specific dangerous situation. For example, in order to output a warning sound, the driver warning controller 231 may use a vehicle sound system to output the warning sound. Alternatively, in order to display a warning message, the driver warning controller 231 may output the warning message through a head-up display (HUD) or a side mirror display. Alternatively, in order to generate warning vibrations, the driver warning controller 231 may operate a vibration motor mounted on a steering wheel.

Regarding the headlamp controller 232, for example, the headlamp controller 232 is positioned at a front side of the vehicle to control a headlamp for securing a driver's field of view forward from the vehicle at night. For example, the headlamp controller 232 may perform high and low beam control, left and right auxiliary light control, adaptive headlamp control, or the like.

Regarding the vehicle attitude controller 233, for example, the vehicle attitude controller 233 is referred to as a vehicle dynamic control (VDC) or electrical stability program (ESP) device and performs control such that a vehicle behavior is corrected through electronic equipment when the vehicle behavior suddenly becomes unstable due to a road condition or a driver's urgent steering wheel operation. For example, when sensors such as a wheel speed sensor, a steering angle sensor, a yaw rate sensor, and a cylinder pressure sensor sense a steering wheel operation and a steering direction of the steering wheel does not match that of wheels, the vehicle attitude controller 233 performs control such that the braking force of each wheel is distributed using an anti-lock braking system (ABS) or the like.

Regarding the steering controller 234, for example, the steering controller 234 controls an electronic power steering system (MPDS) for operating the steering wheel. For example, when the vehicle is expected to collide, the steering controller 234 controls the steering of the vehicle such that the collision may be avoided or such that damage may be minimized.

Regarding the engine controller 235, for example, when the ECU 220 receives data from an oxygen sensor, an air volume sensor, or a manifold absolute pressure sensor, the engine controller 235 serves to control components such as an injector, a throttle, and a spark plug according to a control command of the ECU 220.

Regarding the suspension controller 236, for example, the suspension controller 236 is a device that performs motor-based active suspension control. Specifically, by variably controlling the damping force of a shock absorber, the suspension controller 236 provides smooth ride comfort during normal driving and provides hard ride comport during high-speed driving or upon attitude changes, thereby securing ride comfort and driving stability. Also, the suspension controller 236 may perform vehicle height control, attitude control, or the like as well as damping force control.

Regarding the brake controller 237, for an example, the brake controller 237 controls whether to operate a brake of the vehicle and controls the pedal effort of the brake. For example, when a forward collision is probable, irrespective of whether a driver operates a brake, the brake controller 237 may perform control so that emergency braking is automatically activated according to a control command of the ECU 220.

Meanwhile, as described above with reference to the drawings, although it has been described that each of the MCU, the ECU, and the controller is an independent component, it should be understood that the present disclosure is not necessarily limited thereto. Two or more MCUs may be integrated into one MCU and may interwork with each other. Two or more MCUs and an ECU may be integrated into one device. Two or more controllers may be integrated into one controller and may interwork with each other. Two or more controllers and an ECU may be integrated into one device.

Figure 3A:
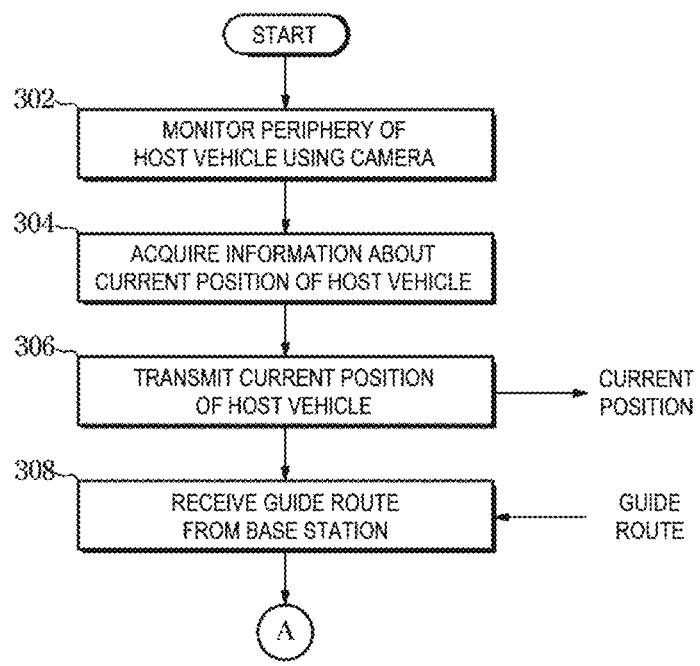
FIGS. 3A and 3B are diagrams illustrating a driving assistance method according to one embodiment of the present disclosure.
Figure 3B:
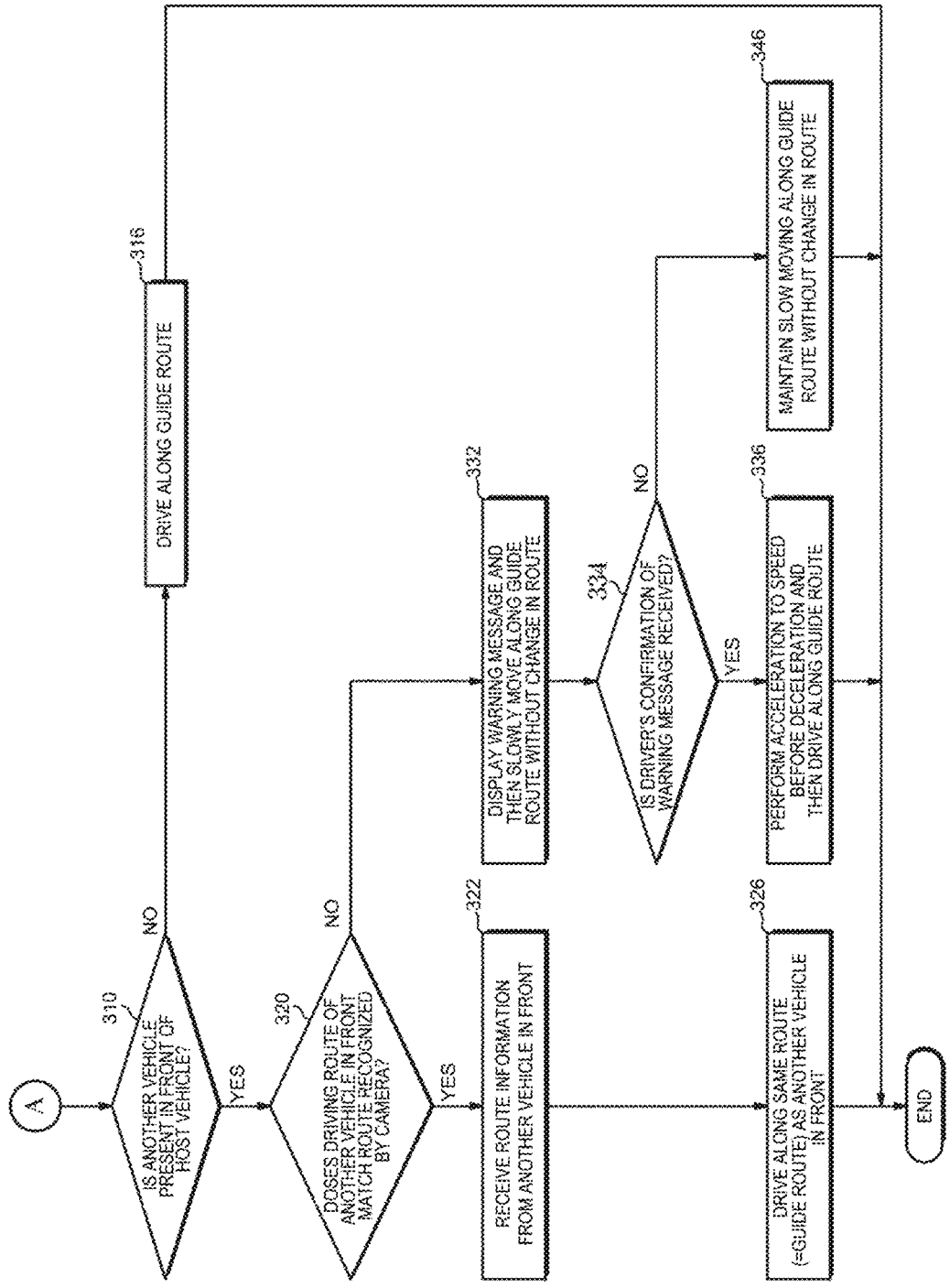

FIGS. 3A and 3B are diagrams illustrating a driving assistance method according to one embodiment of the present disclosure. "A" in FIG. 3A leads to "A" in FIG. 3B. The driving assistance method of FIGS. 3A and 3B may be executed by the device configurations of FIGS. 1 and 2 described above.

First, as shown in FIG. 3A, an ECU 220 of a host vehicle 100 monitors a surrounding situation of the host vehicle 100 by driving a camera of the host vehicle 100 through a camera MCU 216 (302). In this case, the monitored surrounding situation may include information about other vehicles 104 and 106, pedestrians, obstacles, lines, lanes, and the like around the host vehicle 100. In particular, the ECU 220 monitors a change in driving route (driving trajectory) of another vehicle 106 driving in the same lane as the host vehicle 100 in front of the host vehicle 100.

The ECU 220 acquires information about a current position of the host vehicle 100 (304). The information about the current position of the host vehicle 100 may be GPS coordinates of the current position received from a navigation MCU 214.

The ECU 220 transmits the information about the current position of the host vehicle 100 through V2X communication (306). The information about the current position transmitted from the host vehicle 100 through the V2X communication may be transmitted to a nearby base station 102 or other nearby vehicles 104 and 106.

When the host vehicle 100 transmits the current position thereof through the V2X communication, the ECU 220 may receive information about a guide route based on the current position of the host vehicle 100 from the base station 102 (308). Specifically, information about a guide route generated by a remote server (not shown) is transmitted to the host vehicle 100 through the base station 102 for V2X communication. In this case, a guide route provided to the host vehicle 100 from the base station 102 is the guide route generated by the server based on the current position of the host vehicle 100 and a result of monitoring a surrounding situation. The host vehicle 100 may perform autonomous driving with reference to the guide route. The guide route includes what road to drive on. In particular, when there are a plurality of lanes on a road, the guide route includes what lane to use. In addition, the guide route which the host vehicle 100 received from the base station 102 includes average values of lateral positions and longitudinal positions of another vehicle 106 driving ahead in a lane in which the host vehicle 100 is currently driving. For example, the guide route may include information about whether a plurality of other vehicles 106, which are driving in front of the host vehicle 100, perform the same avoidance driving or lane change at a specific position on the road ahead.

In FIG. 3B, when it is confirmed from a result of monitoring a surrounding situation of the host vehicle 100 through the camera that no other vehicle 106 is in front of the host vehicle 100 ("NO" of 310), the ECU 220 controls the host vehicle 100 to perform autonomous driving along the guide route received through the base station 102 (316).

On the other hand, when it is confirmed that another vehicle 106 is in front of the host vehicle 100 ("YES" of 310), the ECU 220 checks whether a driving route of another vehicle 106 in front is the same as the guide route received through the base station 102 (320). This is to check whether an unexpected emergency situation that could not be confirmed through the camera has occurred in front of the vehicle 100. That is, in preparation for a case in which a corresponding emergency situation is not directly recognized through the camera, although the emergency situation has occurred as in a case in which a construction site is present ahead in a lane in which the host vehicle 100 is driving or a case in which a vehicle involved in an accident is left unattended, a driving route of another vehicle 106 in front recognized through the camera is compared with the guide route received through the base station 102 to determine whether the driving route is the same as the guide route, and by responding in different ways according to comparison results, it is possible to more safely respond to an emergency situation not recognized through the camera.

To this end, when the driving route of another vehicle 106 in front recognized through the camera is the same as the guide route received from the base station 102 ("YES" of 320), the ECU 220 determines that a special avoidance maneuver is not required because an emergency situation has not occurred on the guide route received from the base station 102 and receives route information of another vehicle 106 from another vehicle 106 in front through V2X communication for safer autonomous driving (322). In addition, the ECU 220 controls the host vehicle 100 to drive along the same driving route as another vehicle 106 in front (326). That is, when another vehicle 106 also receives the same route as the guide route received from the base station 102, since it may be determined that an emergency situation, in which avoidance driving is required, has not occurred in front of the host vehicle 100, it is preferable that the host vehicle 100 drive along the same route as an actual driving route of another vehicle 106, that is, along the guide route received from the base station 102.

In 320 described above, when the driving route of another vehicle 106 in front recognized through the camera is not the same as the guide route received from the base station 102 ("NO" of 320), the ECU 220 determines that an emergency situation, in which avoidance driving is required, has occurred on the guide route received from the base station 102, displays a warning message to alert a driver to be careful, and then decelerates the host vehicle 100 to a preset speed for safety so that the host vehicle 100 drives along an existing guide route without a change in route and slowly moves (332).

Figure 4:
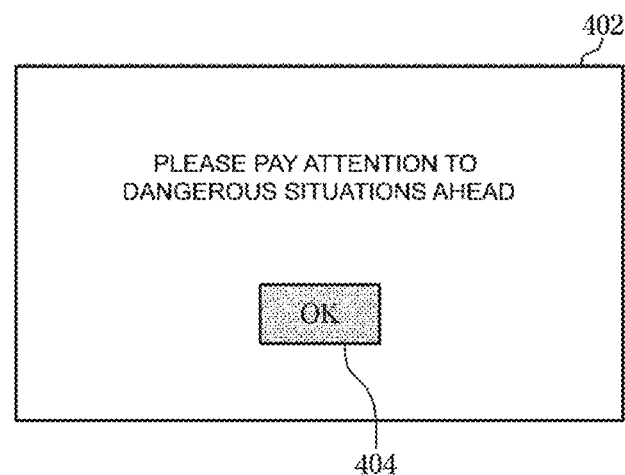
FIG. 4 is a diagram illustrating an example of displaying a warning message to alert a driver to be careful.

FIG. 4 is a diagram illustrating an example of displaying a warning message to alert a driver to be careful. As shown in FIG. 4, a warning message such as "please pay attention to dangerous situation ahead" may be displayed on a display 402 provided in the host vehicle 100 to alert a driver to be careful. The display 402 may be, for example, a display of a navigation device. The warning message may also be output in the form of a sound through a speaker. In FIG. 4, an OK button 404 is for receiving the driver's confirmation of the warning message. That is, in a situation in which the warning message shown in FIG. 4 is output, when a driver checks a situation ahead and determines that there will be no problem even when the driver drives along an existing guide route, the driver may touch the OK button 404 of FIG. 4 to notify the ECU 220 that the corresponding situation has been sufficiently checked.

Returning to FIG. 3B, when the driver's confirmation of the warning message as shown in FIG. 4 is received (that is, when a touch operation of the OK button 404 occurs) ("YES" of 334), the ECU 220 determines that it is okay to drive along the guide route at an existing speed, accelerates to a speed before slow moving, and then performs autonomous driving along an existing guide route (336). That is, in this case, since the driver checks the situation ahead and confirms that there is no problem even when the driver drives along the existing guide route, acceleration to the previous speed before deceleration may be performed to drive along the existing guide route.

In 334, when the driver's confirmation of the warning message as shown in FIG. 4 is not received (that is, when a touch operation of the OK button 404 does not occur) ("NO" of 334), the ECU 220 determines that the driver has not accurately checked the situation ahead and decreases a speed of the host vehicle 100 for safety so that the host vehicle 100 drives along the existing guide route without a change in route and continues to slowly move (346). In this case, since the driver has not accurately checked the situation ahead, it is preferable that, without a change in route, an existing guide route and a slow moving state be maintained to sufficiently respond to an unexpected emergency situation.

According to the present disclosure, the safety of a driver and a vehicle is ensured by enabling a quick and appropriate response to an emergency situation that is not found due to a sensor recognition error during autonomous driving of a vehicle.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A driving assistance method comprising:
monitoring a change in driving route of another vehicle traveling in front of a host vehicle through a camera of the host vehicle;
receiving a guide route for autonomous driving through vehicle-to-everything (V2X) communication;
decelerating the host vehicle to a preset speed so that the host vehicle slowly travels along the guide route, based on the received guide route not matching the driving route of the other vehicle;
outputting a warning message to prepare for an emergency situation ahead of the host vehicle, based on the received guide route not matching the driving route of the other vehicle; and increasing a speed of the host vehicle to a speed before decelerating so that the host vehicle travels along the guide route, based on receiving a driver's confirmation of the warning message.

2. The driving assistance method of claim 1, further comprising maintaining a slow moving state along the guide route, based on not receiving the driver's confirmation of the warning message.

3. The driving assistance method of claim 1, further comprising driving the host vehicle along the same route as the other vehicle in front, based on the received guide route matching the driving route of the other vehicle.

4. The driving assistance method of claim 3, further comprising receiving route information from the other vehicle in front through the V2X communication to drive the host vehicle along the same route as the other vehicle in front.

5. The driving assistance method of claim 1, further comprising driving the host vehicle along the received guide route, based on the other vehicle not being present in front of the host vehicle.

6. The driving assistance method of claim 1, wherein the other vehicle traveling in front of the host vehicle is another vehicle traveling in the same lane as a lane in which the host vehicle drives.

7. A driving assistance apparatus comprising:
a camera provided to photograph surroundings of a host vehicle; and
a processor configured to:
monitor a change in driving route of another vehicle traveling in front of the host vehicle through the camera,
receive a guide route for autonomous driving through vehicle-to-everything (V2X) communication,
perform control such that the host vehicle decelerates to a preset speed so that the host vehicle slowly travels along the guide route, based on the received guide route not matching the driving route of the other vehicle,
perform control such that a warning message is output to prepare for an emergency situation ahead of the host vehicle, based on the received guide route not matching the driving route of the other vehicle, and
perform control such that a speed of the host vehicle increases to a speed before decelerating so that the host vehicle travels along the guide route, based on a driver's confirmation of the warning message being received.

8. The driving assistance apparatus of claim 7, wherein the processor further performs control such that a slow moving state is maintained along the guide route, based on the driver's confirmation of the warning message not being received.

9. The driving assistance apparatus of claim 7, wherein the processor further performs control such that the host vehicle travels along the same route as the other vehicle in front, based on the received guide route matching the driving route of the other vehicle.

10. The driving assistance apparatus of claim 9, wherein the processor further receives route information from the other vehicle in front through the V2X communication to drive the host vehicle along the same route as the other vehicle in front.

11. The driving assistance apparatus of claim 7, wherein the processor further performs control such that the host vehicle travels along the received guide route, based on the other vehicle not being present in front of the host vehicle.

12. The driving assistance apparatus of claim 7, wherein the other vehicle traveling in front of the host vehicle is another vehicle traveling in the same lane as a lane in which the host vehicle drives.

13. A driving assistance apparatus comprising:
a camera provided to photograph surroundings of a host vehicle; and
a processor configured to:
monitor a change in driving route of another vehicle traveling in front of the host vehicle through the camera,
receive a guide route for autonomous driving through vehicle-to-everything (V2X) communication,
perform control such that the host vehicle decelerates to a preset speed so that the host vehicle slowly travels along the guide route, based on the received guide route not matching the driving route of the other vehicle, and
perform control such that a speed of the host vehicle increases to a speed before decelerating so that the host vehicle travels along the guide route, based on a driver's confirmation of a warning message being received.

* * * * *